(12) United States Patent
Ho

(10) Patent No.: US 7,975,758 B2
(45) Date of Patent: Jul. 12, 2011

(54) CONDENSER TUBES CLEANING SYSTEM

(76) Inventor: Chung-Yueh Ho, Kqaohsiung (TW)

( * ) Notice: Subject to any disclaimer, the term of this patent is extended or adjusted under 35 U.S.C. 154(b) by 676 days.

(21) Appl. No.: 12/127,222

(22) Filed: May 27, 2008

(65) Prior Publication Data

US 2009/0294100 A1 Dec. 3, 2009

(51) Int. Cl.
*F28G 1/12* (2006.01)
*F24B 13/00* (2006.01)
(52) U.S. Cl. .................. 165/95; 165/303; 15/21.2
(58) Field of Classification Search .............. 165/94, 165/95, 303; 15/21.2, 3.5, 3.51; *F28G 1/12*
See application file for complete search history.

(56) References Cited

U.S. PATENT DOCUMENTS

| | | | |
|---|---|---|---|
| 4,350,202 A * | 9/1982 | Schulz et al. | 165/95 |
| 4,556,102 A * | 12/1985 | Bochinski et al. | 165/95 |
| 5,176,204 A | 1/1993 | Ben-Dosa | |
| 5,592,990 A * | 1/1997 | Ben-Dosa | 165/95 |
| 5,630,471 A * | 5/1997 | Taprogge | 165/95 |
| 6,070,652 A | 6/2000 | Schildmann et al. | |
| 6,530,427 B1 * | 3/2003 | Jackson | 165/303 |
| 7,036,564 B2 | 5/2006 | Soh | |
| 2007/0204973 A1 * | 9/2007 | Chow | 165/95 |

FOREIGN PATENT DOCUMENTS

JP 2006084130 A * 3/2006

* cited by examiner

*Primary Examiner* — Tho v Duong
(74) *Attorney, Agent, or Firm* — Alan Kamrath; Kamrath & Associates PA

(57) ABSTRACT

The present invention relates to a condenser tubes cleaning system for alleviating the common disadvantage of the prior arts includes a flow diverter, a first branch pipe, a second branch pipe, a three-way valve, a first one-way valve, a bypass pipe, a ball barrel, a liquid supply pipe, a cleaning ball supply pipe, a cleaning ball return pipe, a liquid return pipe, a second one-way valve, a normally open two-way valve, and a ball trap. Thus, the flow diverter is provided with the three-way valve, and the ball trap is provided with the normally open two-way valve, so that the flow diverter and the ball trap have a bypass function that the prior arts do not have, to maintain the constant flow rate in the main supply pipe and the main return pipe without increasing the electrical power load of the main circulating pump.

14 Claims, 5 Drawing Sheets

CONDENSER TUBES CLEANING SYSTEM

BACKGROUND OF THE INVENTION

1. Field of the Invention

The present invention relates to a cleaning system using cleaning balls to clean condenser tubes and, more particularly, to a condenser tubes cleaning system providing a bypass flow function for reducing the electrical power load of the main circulating pump.

2. Description of the Related Prior Art

There are some prior arts, such as four cleaning systems described in patent documents U.S. Pat. Nos. 5,176,204, 5,592,990, 6,070,652, and 7,036,564. A condenser tubes cleaning system described in U.S. Pat. No. 7,036,564 shown in FIG. 5, comprises a flow diverter 11, a ball trap 12, a ball barrel 17, a first normally closed two-way valve V10, and a second normally closed two-way valve V20. The ball barrel 17 contains a number of cleaning balls 16 having a diameter slightly larger than the diameter of the condenser tubes. A condenser 15 is located between the main supply pipe 13 and the main return pipe 14. Thus, when the main circulating pump (not shown) is running and the first normally closed two-way valve 10 is open, the flow diverter 11 and the ball trap 12 create a (static) differential pressure to push the cleaning balls 16 out of the ball barrel 17 to flow through the main supply pipe 13 into the condenser 15 to remove dirty substances or slimes clung on the inner tubes 150 of the condenser 15. However, the first normally closed two-way valve V10 and the second normally closed two-way valve V20 are always closed during the long standby period, i.e. before the cleaning balls 16 are pushed out of the ball barrel 17.

The common disadvantage of all these prior arts is the flow diverter 11 and the ball trap 12 do not have a bypass flow function to relieve the pressure drops in the flow diverter 11 and the ball trap 12 during the long standby period, so that the unrelieved pressure drops become the electrical power load of the main circulating pump, namely the main circulating pump shall consume extra electrical power.

BRIEF SUMMARY OF THE INVENTION

The operation cycle of a condenser tubes cleaning system has three periods, standby, cleaning and recycling periods. In accordance with the present invention, there is provided a condenser tubes cleaning system installed in parallel with the condenser, comprising a flow diverter installed on the water supply pipe and having a side provided with a first branch pipe and a second branch pipe, a three-way valve mounted on the first branch pipe, a first one-way valve, i.e. check valve, mounted at the upstream side of the second branch pipe, a bypass pipe mounted between the three-way valve and the second branch pipe to connect the first branch pipe and the second branch pipe via the three-way valve, a ball trap installed on the main return pipe and having an outer pipe connected to the main return pipe and a cylindrical perforated screen fixed in the outer pipe eccentrically, a ball barrel having a first side provided with a liquid supply pipe connected to the first branch pipe via the three-way valve and a cleaning ball supply pipe connected to the second branch pipe via the first one-way valve, and having a second side provided with a cleaning ball return pipe connected to the cylindrical perforated screen in the ball trap and a liquid return pipe connected to the outer pipe of the ball trap, a second one-way valve mounted on the cleaning ball return pipe, a normally open two-way valve mounted on the liquid return pipe, and a perforated partition fixed in the ball barrel to divide the ball barrel into an upper chamber which is connected to the liquid supply pipe, the cleaning ball supply pipe and the second one-way valve, and a lower chamber which is connected to the normally open two-way valve.

The primary objective of the present invention is to provide a condenser tubes cleaning system that has a bypass flow function so as to maintain the constant flow rate in the complete circulating piping during the long standby period without increasing the electrical power load of the main circulating pump, i.e. to alleviate the common disadvantage of the prior arts.

Another objective of the present invention is to provide a condenser tubes cleaning system, wherein both the flow diverter and the ball trap have a bypass passageway to relieve the pressure drops in the flow diverter and the ball trap.

A further objective of the present invention is to provide a condenser tubes cleaning system, wherein the ball trap having an eccentric cylindrical perforated screen inside is provided with the normally open two-way valve, so that the ball trap not only has a bypass flow passageway but also reduces the size and weight of the ball trap, i.e. to reduce the cost of the ball trap.

Further benefits and advantages of the present invention will become apparent after a careful reading of the detailed description with appropriate reference to the accompanying drawings.

DETAILED DESCRIPTION OF THE INVENTION

Figure 1:
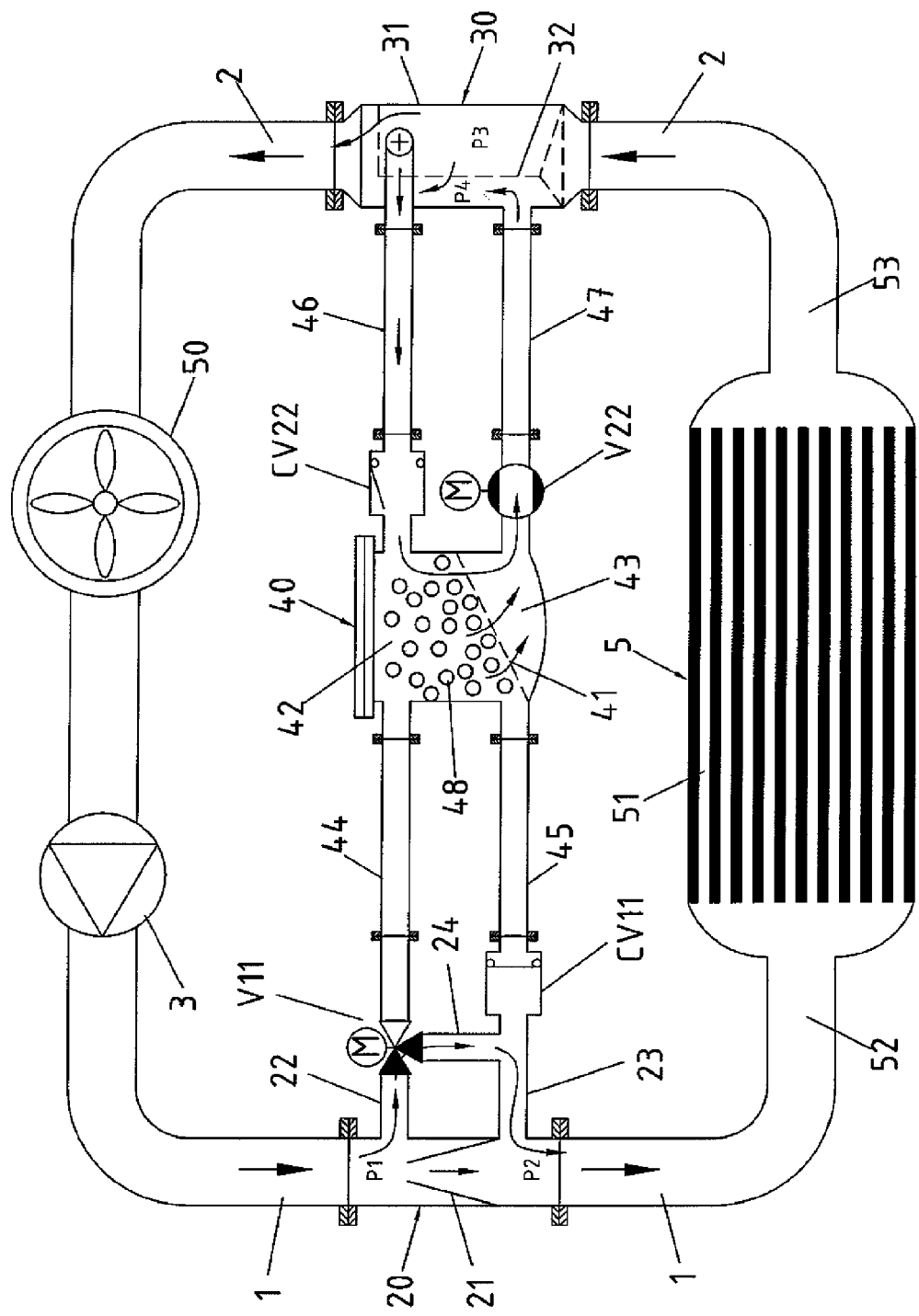
FIG. 1 is the diagrammatic representation of the present invention, illustrates the operation of the present invention during the standby period.
Figure 2:
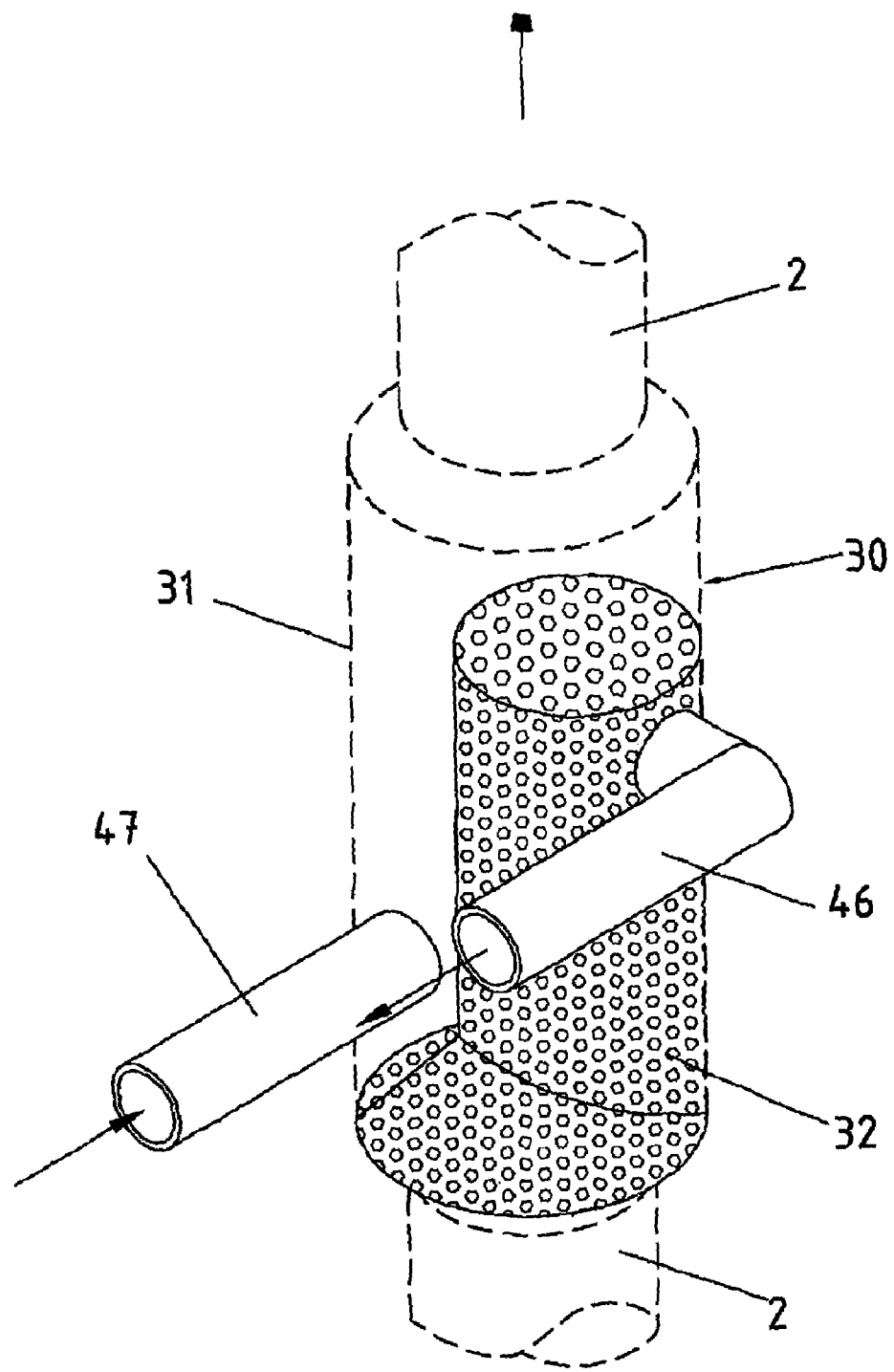
FIG. 2 is a perspective view of a ball trap of the present invention as shown in FIG. 1.

Referring to the drawings and initially to FIGS. 1 and 2, a condenser tubes cleaning system in accordance with the preferred embodiment of the present invention comprises a flow diverter 20, a ball trap 30, and a ball barrel 40.

The main supply pipe 1 and the main return pipe 2 are connected between a condenser 5, a main circulating pump 3 and a cooling tower 50, so that the main circulating pump 3, the main supply pipe 1, the condenser 5, the main return pipe 2 and the cooling tower 50 form a complete circulating piping of a typical condenser cooling system.

The flow diverter 20 is a four-port element. The flow diverter 20 is installed on the main supply pipe 1, near condenser inlet 52. The flow diverter 20 has a side provided with a first branch pipe 22 and a second branch pipe 23. A reducer 21 having a small inlet and a large outlet for creating a differential pressure is fixed in the flow diverter 20. A three-way valve V11 is mounted on the first branch pipe 22. A first one-way valve CV11 is mounted at the upstream side of the second branch pipe 23. A bypass pipe 24 is mounted between the three-way valve V11 and the second branch pipe 23 to connect the first branch pipe 22 and the second branch pipe 23 via the three-way valve V11. In practice, the three-way valve V11 has an opening for the straight flow direction along the first branch pipe 22 so that the liquid, e.g. water, in the first branch pipe 22 is delivered into the ball barrel 40 to push cleaning balls 48 (made of sponge or rubber) out of the ball barrel 40 through cleaning ball supply pipe 45, the first one-way valve CV11, the second branch pipe 23 and into the low pressure end P2 of the flow diverter 20. Alternatively, the liquid in the first branch pipe 22 is delivered through the bypass pipe 24, the second branch pipe 23 and into the low pressure end P2 of the flow diverter 20. Thus, the liquid in the first branch pipe 22 delivered into either the ball barrel 40 or bypass pipe 24 will relieve the pressure drop in the flow diverter 20 so as to maintain the constant flow rate in the complete circulating piping without increasing the electrical power load of the main circulating pump 3.

The ball trap 30 is installed on the main return pipe 2, near condenser outlet 53. The ball trap 30 has an outer pipe 31 connected to the main return pipe 2 and a cylindrical perforated screen 32 fixed in the outer pipe 31 eccentrically, to reduce the size and weight of the ball trap 30. Thus, the cylindrical perforated screen 32 in the ball trap 30 allows the liquid to pass through but not the cleaning balls 48.

The ball barrel 40 contains a number of cleaning balls 48 therein. The ball barrel 40 has a first side provided with a liquid supply pipe 44 connected to the first branch pipe 22 via the three-way valve V11 and a cleaning ball supply pipe 45 connected to the second branch pipe 23 via the first one-way valve CV11. The ball barrel 40 has a second side provided with a cleaning ball return pipe 46 connected to the outlet of cylindrical perforated screen 32 in the ball trap 30 and a liquid return pipe 47 connected to the outer pipe 31 of the ball trap 30. Thus, the ball trap 30 is connected to the cleaning ball return pipe 46 and the liquid return pipe 47 so that partial liquid in the main return pipe 2 flows from the high static pressure end P3 of ball trap 30, passes through the cleaning ball return pipe 46, the ball barrel 40, the liquid return pipe 47 and back into the low static pressure end P4 of the ball trap 30, to relieve the pressure drop of the ball trap 30 so as to maintain the constant flow rate in the complete circulating piping without increasing the electric power load of the main circulating pump 3.

A second one-way valve CV22 is mounted on the cleaning ball return pipe 46 between the ball barrel 40 and the ball trap 30. A normally open two-way valve V22 is mounted on the liquid return pipe 47 between the ball barrel 40 and the ball trap 30. A perforated partition 41 is fixed in the ball barrel 40 to divide the ball barrel 40 into an upper chamber 42 which is connected to the liquid supply pipe 44, the cleaning ball supply pipe 45 and the second one-way valve CV22, and a lower chamber 43 which is connected to the normally open two-way valve V22. Thus, the liquid flows constantly between the ball barrel 40 and the ball trap 30 via the normally open two-way valve V22 to create a turbulent flow in the ball barrel 40 so as to flush and remove the dirty substances clung on the cleaning balls 48. Then, the dirty substances pass through the normally open two-way valve V22, the liquid return pipe 47, the low pressure end P4 of the ball trap 30 and the main return pipe 2 into the cooling tower 50 for being disposal of.

In operation, still referring to FIG. 1, the present invention is disposed at a standby period. In practice, the three-way valve V11 is under the bypass flow condition, and the normally open two-way valve V22 is open. In such a manner, when the main circulating pump 3 is running, partial liquid in the main supply pipe 1 flows through the high pressure end P1 of the flow diverter 20, the first branch pipe 22, the bypass pipe 24, the second branch pipe 23 and back into the low pressure end P2 (P2<P1) of the flow diverter 20 to mix with the main liquid flow. The flow directions are shown in FIG. 1 by the arrows in flow diverter 20. Then, the total liquid in the main supply pipe 1 flows through the tubes 51 in the condenser 5, the main return pipe 2 and into the high pressure end P3 of the ball trap 30. Meanwhile, partial liquid in the ball trap 30 flows through the cleaning ball return pipe 46, the second one-way valve CV22, the ball barrel 40, the normally open two-way valve V22, the liquid return pipe 47 and back into the low pressure end P4 (P4<P3) of the ball trap 30. At the same time, the partial liquid flows constantly between the ball barrel 40 and the ball trap 30 via the normally open two-way valve V22 to produce a turbulent flow in the ball barrel 40 so as to flush and remove the dirty substances clung on the cleaning balls 48. At this time, the static pressure at the low pressure end P2 of the flow diverter 20 is higher than that at the high pressure end P3 of the ball trap 30, so that the first one-way valve CV11 is forced to close, and the liquid at the low pressure end P2 of the flow diverter 20 will not enter the ball barrel 40. Thus, the flow diverter 20 is provided with the three-way valve V11, and the ball trap 30 is provided with the normally open two-way valve V22, so that the flow diverter 20 and the ball trap 30 have a bypass passageway so as to maintain the constant flow rate in the complete circulating piping without increasing the electrical power load of the main circulating pump 3.

Figure 3:
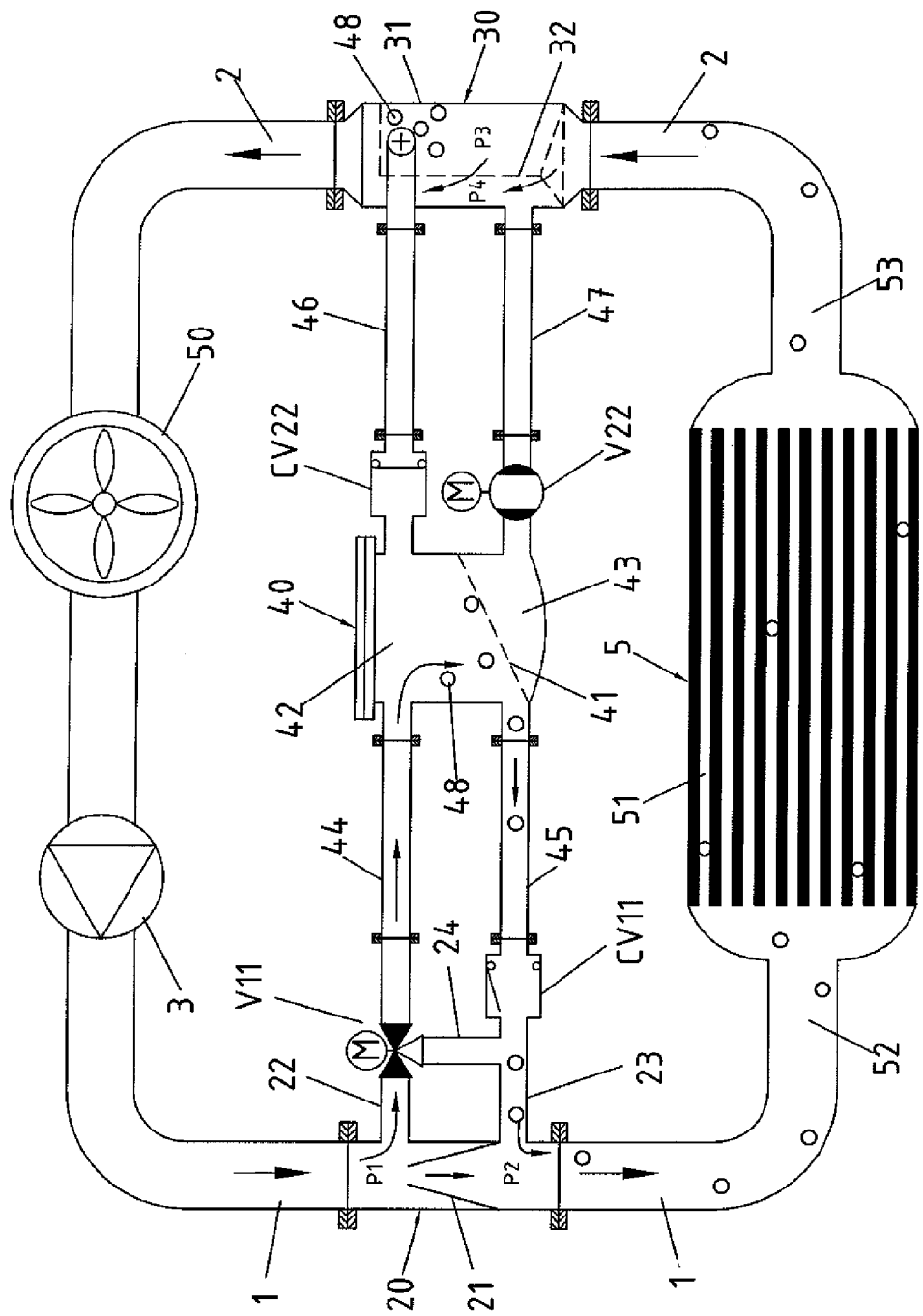
FIG. 3 illustrates the operation of the present invention during the cleaning period.

Alternatively, referring to FIG. 3, the present invention is disposed at a cleaning period. In practice, the three-way valve V11 is under the straight flow condition and the normally open two-way valve V22 is closed. In such a manner, partial liquid in the main supply pipe 1 flows through the high pressure end P1 of the flow diverter 20, the first branch pipe 22 and the liquid supply pipe 44 into the ball barrel 40. At this time, the static pressure at the high pressure end P1 of the flow diverter 20 is higher than that at the low pressure end P2 of the flow diverter 20 and at the high pressure end P3 of the ball trap 30, so that the first one-way valve CV11 is forced to open and the second one-way valve CV22 is forced to close. Thus, the cleaning balls 48 in the ball barrel 40 are pushed out of the ball barrel 40 by the differential pressure, to pass through the first one-way valve CV11, the second branch pipe 23 and into the low pressure end P2 of the flow diverter 20. The flow directions are shown in FIG. 3 by the arrows between flow diverter 20 and ball barrel 40. Then, the total liquid and the cleaning balls 48 flow into the condenser 5 to clean the dirty substances clung on inner tubes 51 of the condenser 5. Then, the dirty substances, the total liquid and the cleaning balls 48 flow out of the condenser 5 into the high pressure end P3 of the ball trap 30. At this time, the perforations of the cylindrical perforated screen 32 in the ball trap 30 have a diameter smaller than that of each of the cleaning balls 48, so that all the cleaning balls 48 are trapped by the cylindrical perforated screen 32 in the ball trap 30 temporarily before the cleaning period ends.

Figure 4:
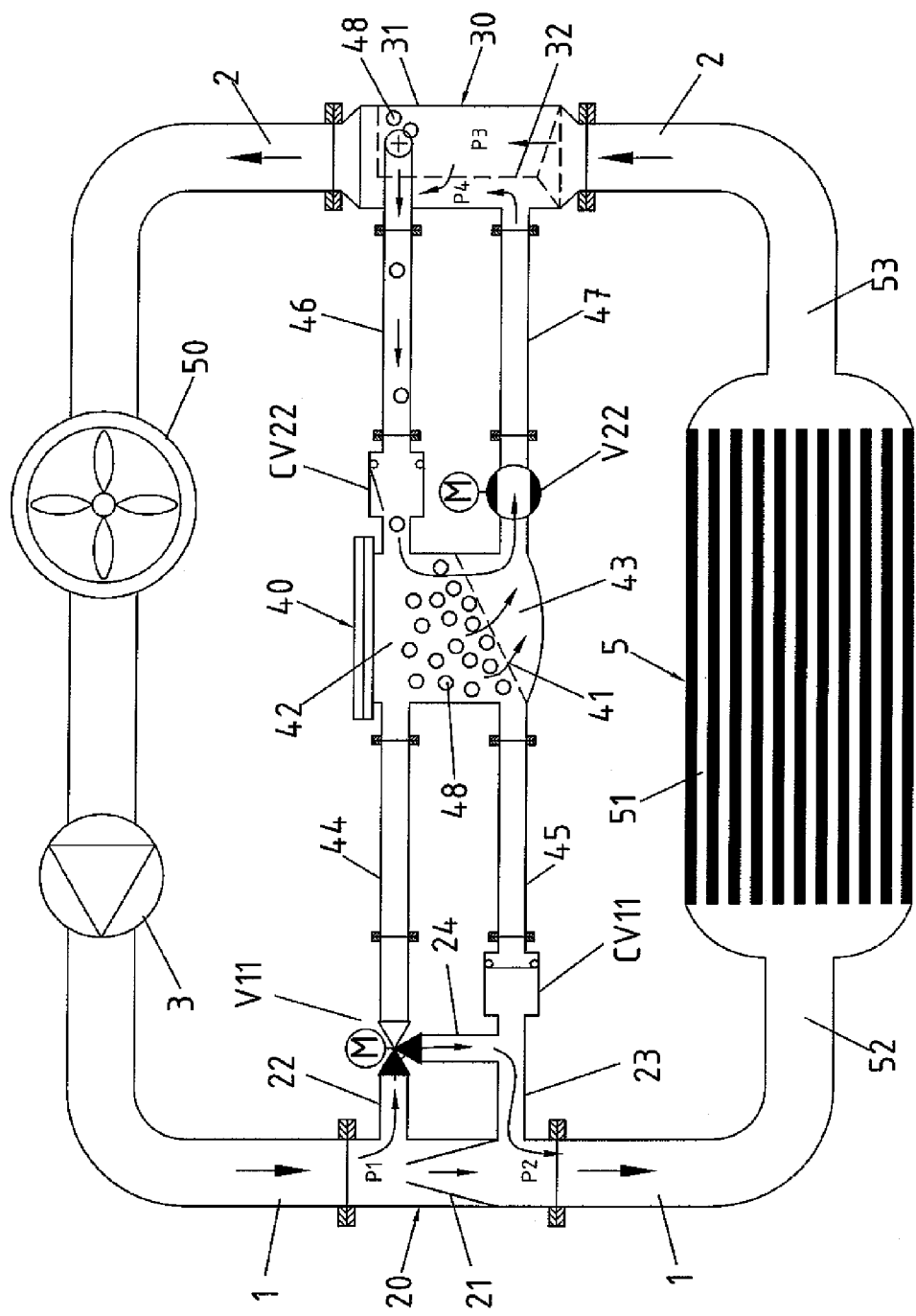
FIG. 4 illustrated the operation of the present invention during the recycling period.
Figure 5:
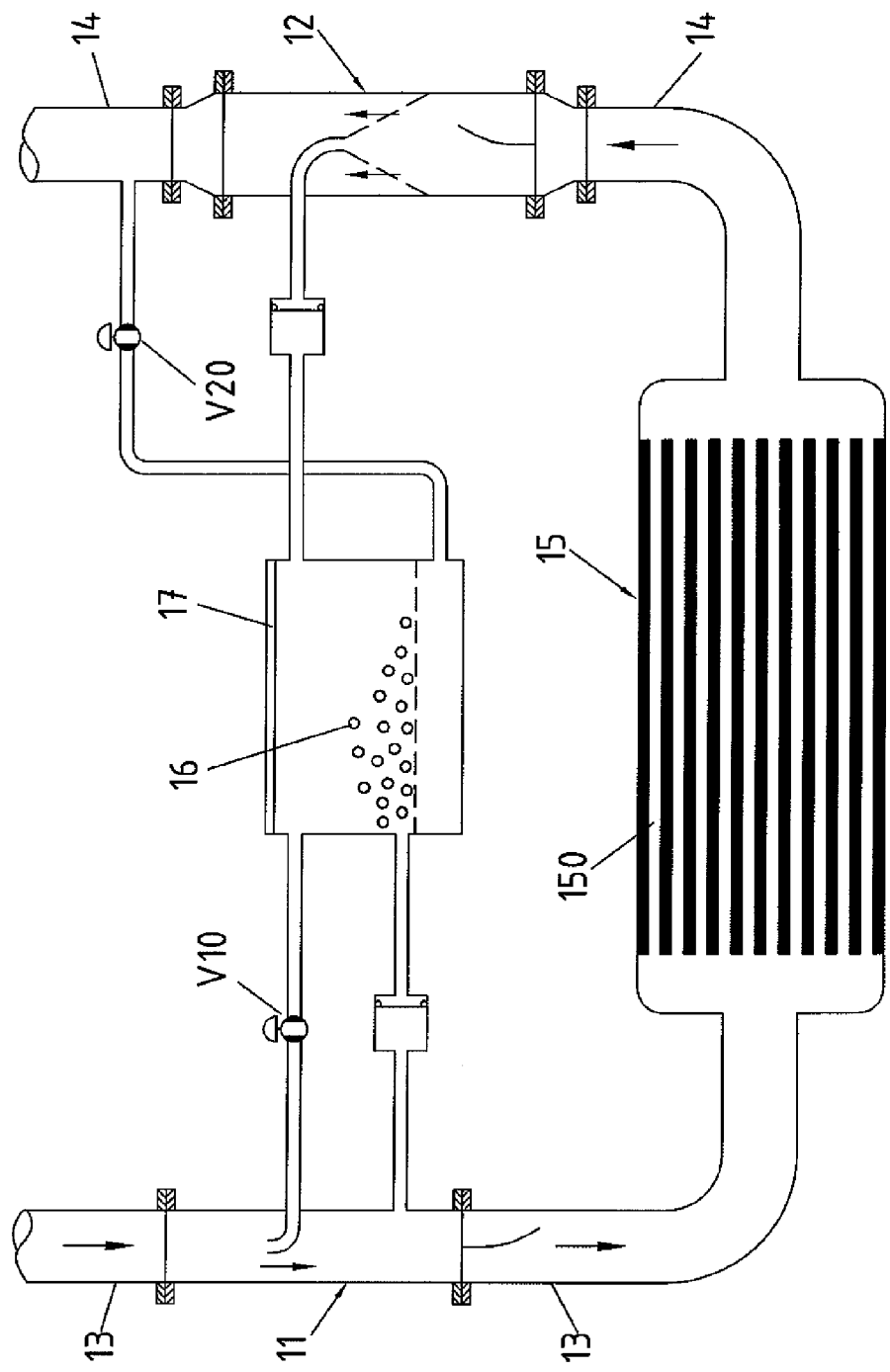
FIG. 5 illustrates a condenser tubes cleaning system in accordance with the prior art described in patent document U.S. Pat. No. 7,036,564.

Alternatively, referring to FIG. 4, the operation of present invention is disposed at a recycling period. In practice, the three-way valve V11 is under the bypass flow condition, and the normally open two-way valve V22 is open. In such a manner, the trapped cleaning balls 48 in the cylindrical perforated screen 32 pass through the cleaning ball return pipe 46 and the second one-way valve CV22 into the ball barrel 40. At this time, the perforations of the perforated partition 41 in the ball barrel 40 have a diameter smaller than that of each of the cleaning balls 48, so that all the cleaning balls 48 are collected in the upper chamber 42 of the ball barrel 40 waiting for the next cleaning period. Meanwhile, the static pressure at the low pressure end P2 of the flow diverter 20 is higher than that at the high pressure end P3 of the ball trap 30, so that the first one-way valve CV11 is forced to close, and the liquid at the low pressure end P2 of the flow diverter 20 will not enter the ball barrel 40.

Thus, the flow diverter 20 is provided with the three-way valve V11, and the ball trap 30 is provided with the normally open two-way valve V22, so that the flow diverter 20 and the ball trap 30 have a bypass passageway so as to maintain the total constant flow rate of the complete circulating piping without increasing the electrical power load of the main circulating pump 3.

Although the present invention has been explained in relation to its preferred embodiments as mentioned above, it is to be understood that many other possible modifications and variations can be made without departing from the scope of the present invention. For example, if the condenser 5 is provided with an inlet shutoff valve or stop valve (not shown), it can be used to substitute for the reducer 21 in the flow diverter 20 for reducing the cost of flow diverter 20. It is, therefore, contemplated that the appended claims will cover such modifications and variations that fall within the true scope of the invention.

The invention claimed is:

1. A condenser tubes cleaning system with bypass function, comprising:
    a number of cleaning balls for circulating with the liquid through the condenser tubes;
    a flow diverter installed on the main supply pipe and having a side provided with a first branch pipe and a second branch pipe;
    a three-way valve mounted on the first branch pipe;
    a first one-way valve mounted at the upstream side of the second branch pipe;
    a bypass pipe mounted between the three-way valve and the second branch pipe to connect the first branch pipe and the second branch pipe via the three-way valve;
    a ball trap installed on the main return pipe and having an outer pipe connected to the main return pipe and a cylindrical perforated screen fixed in the outer pipe eccentrically;
    a ball barrel having a first side provided with a liquid supply pipe connected to the first branch pipe via the three-way valve and a cleaning ball supply pipe connected to the second branch pipe via the first one-way valve and having a second side provided with a cleaning ball return pipe connected to the cylindrical perforated screen of the ball trap and a liquid return pipe connected to the outer tube of the ball trap;
    a second one-way valve mounted on the cleaning ball return pipe;
    a normally open two-way valve mounted on the liquid return pipe;
    a perforated partition fixed in the ball barrel to divide the ball barrel into an upper chamber which is connected to the liquid supply pipe, the cleaning ball supply pipe and the second one-way valve, and a lower chamber which is connected to the normally open two-way valve.

2. The condenser tubes cleaning system with bypass function in accordance with claim 1, further comprising:
    a reducer fixed in the flow diverter and located between the first branch pipe and the second branch pipe.

3. The condenser tubes cleaning system with bypass function in accordance with claim 2, wherein the reducer has a small inlet and a large outlet.

4. The condenser tubes cleaning system with bypass function in accordance with claim 1, wherein the second one-way valve is mounted between the ball barrel and the cleaning ball return pipe.

5. The condenser tubes cleaning system with bypass function in accordance with claim 1, wherein the a normally open two-way valve is mounted between the ball barrel and the liquid return pipe.

6. The condenser tubes cleaning system with bypass function in accordance with claim 1, wherein the flow diverter is a four-port element.

7. The condenser tubes cleaning system with bypass function in accordance with claim 1, wherein the bypass pipe is mounted between the branch opening of the three-way valve and the second branch pipe.

8. The condenser tubes cleaning system with bypass function in accordance with claim 1, wherein
    the ball barrel contains a number of cleaning balls therein;
    the perforated partition allows passage of liquid and stops passage of the cleaning balls.

9. The condenser tubes cleaning system with bypass function in accordance with claim 8, wherein the perforated partition is fixed in the ball barrel to divide the ball barrel into the upper chamber and the lower chamber.

10. The condenser tubes cleaning system with bypass function in accordance with claim 8, wherein liquid flows constantly between the ball barrel and the ball trap via the normally open two-way valve to create a turbulent flow in the ball barrel so as to flush and remove dirty substances clung on the cleaning balls;
    the dirty substances, total liquid and cleaning balls pass through the normally open two-way valve, the liquid return pipe, the outer pipe of the ball trap and the main return pipe.

11. The condenser tubes cleaning system with bypass function in accordance with claim 1, wherein the ball trap is connected to the cleaning ball return pipe and the liquid return pipe so that partial liquid in the main return pipe flows through the cleaning ball return pipe and the liquid return pipe to relieve the pressure drop of the ball trap.

12. During the standby period, the condenser tubes cleaning system with bypass function in accordance with claim 1, wherein
    the passageway between the first branch pipe and the second branch pipe is opened via the bypass pipe by operating of the three-way valve;
    the normally open two-way valve is open;
    partial liquid in the main supply pipe flows through a high pressure end of the flow diverter, the first branch pipe, the bypass pipe and the second branch pipe into a low pressure end of the flow diverter;
    liquid in the main return pipe flows into a high pressure end of the ball trap;
    partial liquid in the ball trap flows through the cleaning ball return pipe, the second one-way valve, the ball barrel, the normally open two-way valve and the liquid return pipe into a low pressure end of the ball trap;
    the liquid flows constantly between the ball barrel and the ball trap via the normally open two-way valve to create a turbulent flow in the ball barrel;
    the static pressure at the low pressure end of the flow diverter is higher than that at the high pressure end of the ball trap, so that the first one-way valve is forced to close, and the liquid at the low pressure end of the flow diverter will not enter the ball barrel.

13. During the cleaning period, the condenser tubes cleaning system with bypass function in accordance with claim 1, wherein
    the passageway between the first branch pipe and the liquid supply pipe is opened by operating the three-way valve;
    the normally open two-way valve is closed;

partial liquid in the main supply pipe flows through the high pressure end of the flow diverter, the first branch pipe and the liquid supply pipe into the ball barrel;

the static pressure at the high pressure end of the flow diverter is higher than that at the low pressure end of the flow diverter and at the high pressure end of the ball trap, so that the first one-way valve is forced to open and the second one-way valve is forced to close;

the cleaning balls in the ball barrel are pushed out of ball barrel by a differential pressure to pass through the first one-way valve and the second branch pipe into the low pressure end of the flow diverter to mix with the other liquid of the main supply pipe;

the total liquid and the cleaning balls in the main supply pipe pass through the tubes in condenser and flow into the high pressure end of the ball trap;

the cleaning balls are trapped by the cylindrical perforated screen in the ball trap.

14. During the recycling period, the condenser tubes cleaning system with bypass function in accordance with claim 1, wherein the passageway between the first branch pipe and the second branch pipe is opened via the bypass pipe by operating of the three-way valve;

the normally open two-way valve is open;

the trapped cleaning balls in the cylindrical perforated screen pass through the cleaning ball return pipe and the second one-way valve into the ball barrel;

the perforated partition in the ball barrel prevents the cleaning balls from flowing through the two-way valve into the liquid return pipe;

the static pressure of the low pressure end of the flow diverter is higher than that of the high pressure end of the ball trap, so that the first one-way valve is forced to close, and the liquid at the low pressure end of the flow diverter will not enter the ball barrel.

* * * * *